Sept. 28, 1965  J. V. BUTLER  3,208,595
WATER SOFTENING DEVICE
Filed Nov. 8, 1962  3 Sheets-Sheet 1

INVENTOR.
James V. Butler
BY WHITEHEAD, VOGL & LOWE
PER *Frank C. Lowe*
ATTORNEYS Sept. 28, 1965  J. V. BUTLER  3,208,595
WATER SOFTENING DEVICE
Filed Nov. 8, 1962  3 Sheets-Sheet 2

INVENTOR.
James V. Butler
BY WHITEHEAD, VOGL & LOWE
PER Frank C. Lowe
ATTORNEYS

United States Patent Office 3,208,595
Patented Sept. 28, 1965

3,208,595
WATER SOFTENING DEVICE
James V. Butler, Claremont, Calif., assignor to Min-I-Soft, a corporation of Colorado
Filed Nov. 8, 1962, Ser. No. 236,267
3 Claims. (Cl. 210—282)

This invention relates to water conditioning apparatus, and more particularly to water softeners of the class which includes containers adapted to hold a body of particulate ion-exchange material such as selected types of commercial zeolites through which water percolates to effect the replacement of hardness-producing substances with sodium. As such, the invention will be hereinafter referred to as a water softening apparatus and, as a portable water softener.

A primary object of the invention is to provide a novel and improved water softener which is formed as a small, portable, compact unit in distinct contrast with conventional types of water softener units which are large and are adapted only for permanent installations.

Another object of the invention is to provide a novel and improved portable water softener which is especially adapted to be quickly and easily mounted upon the spout of an ordinary faucet.

Another object of the invention is to provide an improved water softener of small, compact proportions which is of ample operative capacity to be used for ordinary light household washing operations such as dishwashing, washing lingerie, and shampooing, and is easy to recharge after such uses.

Another object of the invention is to provide a novel and improved portable water softener which incorporates within its container a unique arrangement of baffles and guiding means adapted to promote effective percolation movement of water through the entire body of zeolite particles and to direct the water flow through a circuitous passageway to effect proper contact time between the water and zeolite.

Another object of the invention is to provide a novel and improved portable water softener which may be easily and quickly recharged.

Further objects of the invention are to provide a novel and improved portable water softener which is a neat, compact, low-cost, rugged, and durable unit.

With the foregoing and other objects in view, all of which more fully hereinafter appear, my invention comprises certain constructions, combinations, and arrangements of parts and elements as hereinafter described, defined in the appended claims, and illustrated in the accompanying drawing, in which:

Figure 1:
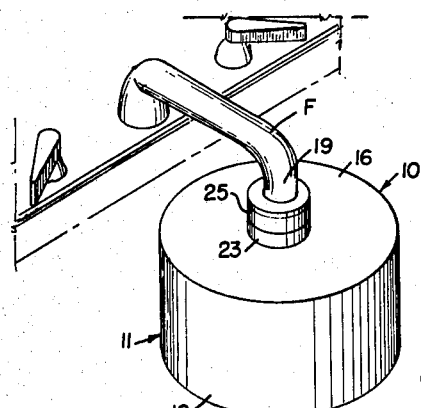
FIGURE 1 is a small scale perspective view representing a typical sink faucet having my improved water softener unit affixed to the discharge spout thereof.

Most of the so-called hard waters found throughout the United States include small amounts of calcium and magnesium salts dissolved in the water. These salts are actually relatively insoluble and will be precipitated out of solution by substances such as soaps and other detergents. This precipitate, usually as scum, renders washing in hard water undesirable and unsatisfactory and often the water will have to be chemically treated before soaps and detergents are at all effective in their washing action. The use of zeolites in water softening operations is well known and the basic operation of zeolite as a water softener is to replace the undesirable calcium and magnesium ions in the solution with highly soluble sodium ions which will not affect the action of soaps and detergents. In operation of a conventional water softener, water is passed through a container holding zeolite particles at a selected rate to expose the water to the surfaces of the zeolite particles for a selected time interval, the effective exchange of sodium and calcium ions being related, among other factors, to contact time and also to the total of available contact surfaces of zeolite particles. After this ion-exchange action has progressed to the point of equilibrium, recharging of the zeolite is possible by submerging the particles in a brine solution and thus the zeolite may be used repeatedly for an indefinite period without actual loss of the material.

It has been found that at least several seconds of time is required for effective ion exchange and in the past it has been assumed that a comparatively large body of zeolite will be necessary for this purpose. Therefore, all practical commercial units are designed on this basis and are necessarily large, non-portable, permanently-installed, and expensive units. There is, however, a real and definite need for a small, low-cost, portable water softener unit for uses such as dishwashing, laundrying of lingerie, and shampooing, either to supplement an available permanently-installed unit or, what is more important, to provide water softening facilities where large permanently-installed water softeners are not available.

The present invention was conceived and developed with such considerations in view, and the invention comprises in essence, a small, portable water softener unit capable of treating approximately 50 gallons of water and which is especially adapted to be connected to an ordinary faucet spout. Thus unit contains within its structure an improved arrangement of baffles to control, direct, and regulate the rate of water flow through a body of zeolite within the container, such in a manner as to permit efficient and effective contact with the zeolite and a resulting ion exchange action adequate to soften the water during its passage through the unit.

Referring more particularly to the drawing, the water softener is formed as a cylindrical, axially-symmetrical body 10 which may be approximately 5-inches in diameter and 3½-inches high, which is sufficient to hold approximately one pound of zeolite and treat approximately fifty gallons of water. The body includes a cup-like shell 11 having a cylindrical sidewall 12 and a floor section 13. This floor section 13 is located a short distance above the bottom edge of the sidewall to permit the sidewall to project a short distance below the floor section as a depending rim 14. This rim facilitates setting the unit upon a flat surface when not in use and provides clearance space for a discharge spout 15, depending from the floor 13 as hereinafter described.

This shell 11 is closed by a disc-shaped top lid 16 having the same diameter as the shell wall 12. The underside of the lid includes a peripheral bead 17, and this bead is adapted to mesh with a mating bead-groove 18 at the upper edge of the wall 12 to provide for a tight, waterproof closure of the unit and suitable sealing surfaces for permanently closing the unit. While the shell 11 and lid 16 may be formed of any water-resistant, structurally-rigid material, these components are preferably constructed of any one of the better types of high-impact, thermoplastic materials such as polypropylene or polyallymer. Such materials are ideal for injection moulding, manufacturing operations to form tough and strong units. Moreover, when the shell 11 and lid 16 are so formed, other structural components within the unit, hereinafter described, may also be formed integrally with either the shell 11 or lid 16 to minimize the number of individual parts required in assembly of the unit.

Figure 2:
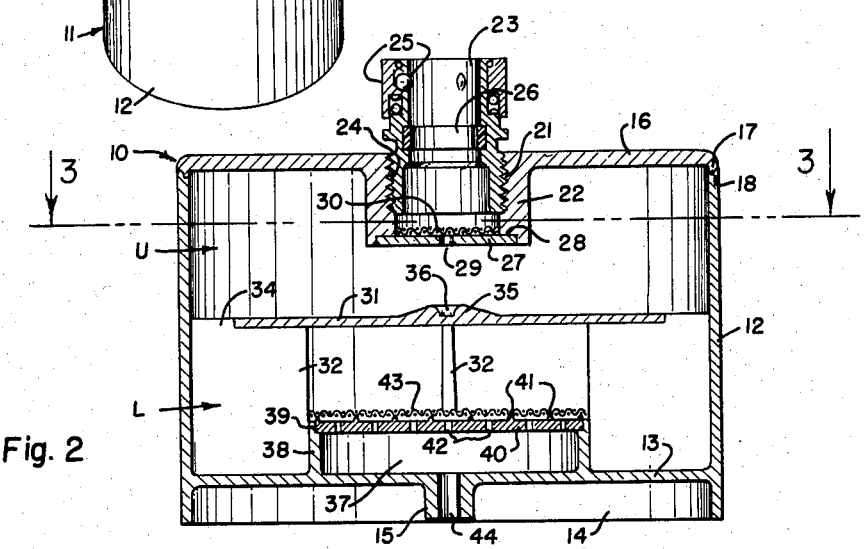
FIGURE 2 is a sectional elevational view of the water softener unit per se, as taken substantially from the indicated line 2—2 at FIG. 1, but on an enlarged scale.
Figure 5:
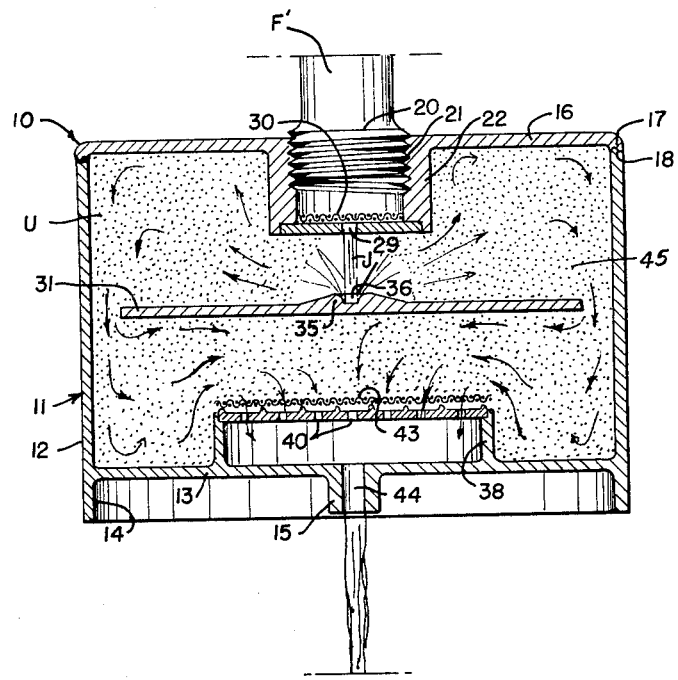
FIGURE 5 is a sectional elevational view of the unit, similar to the showing at FIG. 2, as viewed from the indicated line 5—5 at FIG. 3, and delineated to illustrate the unit as being filled with zeolite particles and with arrows to indicate the various flow movements through the unit and illustrating further, an alternate manner of affixing the unit to the end of a threaded-spout-type faucet.

The water softener is especially adapted to be mounted upon a faucet spout which may be a smooth-end spout 19 of the faucet F as illustrated at FIG. 1, or a threaded end spout 20 of a faucet F' as illustrated at FIG. 5. In either case the faucet spout extends into a threaded pocket 21 at the axial center of the lid 16. This pocket 21 is formed within a centered boss 22 which depends from the under side of the lid 16 with the threads being adapted to receive the threaded spout end 20 of the faucet F' as illustrated at FIG. 5, or to receive a short tubular adapter-connector 23 having a threaded base 24 as illustrated at FIG. 2. This adapter-connecter 23 is formed as a short tubular member adapted to receive the smooth-end spout 19 of faucet F, and includes a tube-gripping means 25 at its top adapted to grip and hold the spout end 19. A resilient, washer-shaped seal ring 26 is positioned in this adapter below the gripping means to provide a leak-proof fit between the faucet-end and the adapter. The elements 25 and 26 are not described in detail since such adapter-connectors are conventional, commercially-obtained units.

It is contemplated that the flow of water from a faucet and into the water softener will be under pressure and to control the rate of this flow, a flat disc-shaped washer 27 extends across the bottom of the pocket 21 and is permanently secured in place, as by gluing or welding, and preferably in a rabbeted socket 28 at the base of the boss 22. A small axially-centered orifice 29 is formed in this washer 27 and it is contemplated that flow from the faucet and into the water softener will pass through this orifice 29 as a high-velocity jet J, as illustrated at FIG. 5. In order to prevent foreign particles from flowing from the faucet, through the orifice 29 and into the softener, a disc-shaped filter screen 30, of a fine-mesh material such as monofilament nylon, is placed in the pocket 21 directly over the washer 27.

Figure 3:
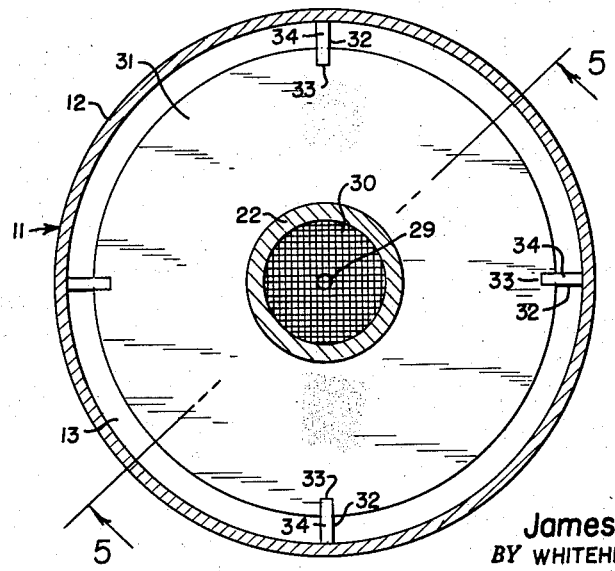
FIGURE 3 is a sectional plan view as taken from the indicated line 3—3 at FIG. 2.
Figure 4:
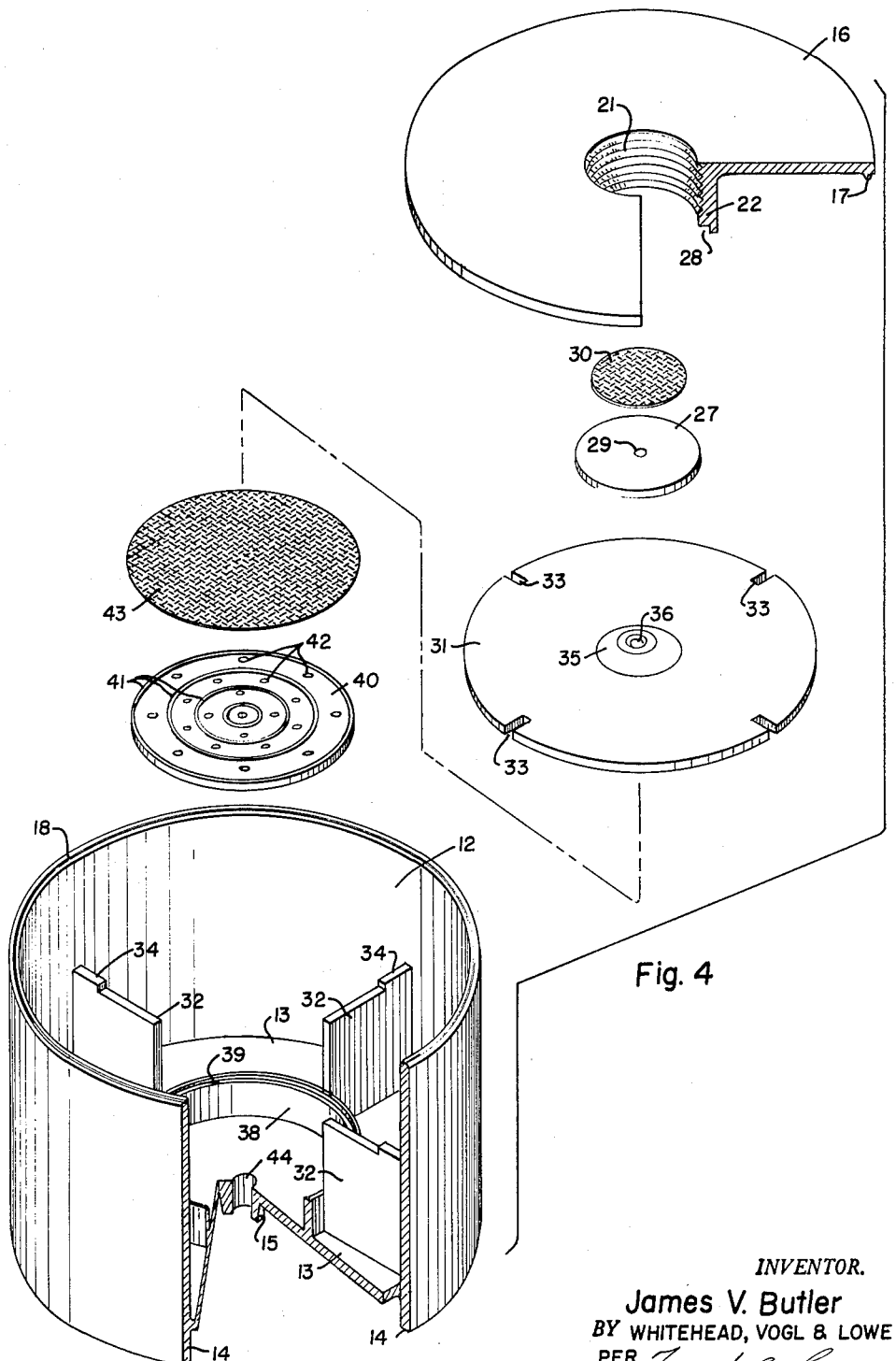
FIGURE 4 is an isometric exploded view of the water softener unit to illustrate the individual component parts thereof, and with portions of the shell structure being broken away to show constructions otherwise hidden from view.

The interior of the water softener is divided into an upper compartment U and a lower compartment L by a flat, circular dish-shaped plate 31 having a diameter slightly less than the internal diameter of the cup 11. This plate 31 is supported and axially centered upon a spaced array of radially-disposed baffles 32 extending about the cup in the lower compartment L, thereof as at 90 degree intervals as illustrated at FIG. 3. In order to facilitate the holding of the plate in its desired axially-centered position, the plate 31 is formed with spaced notches 33 at its periphery in registration with baffles 32 and each baffle 32 includes a small abutment 34 at its outer portion which meshes with the notches 33.

It is contemplated that a water jet J flowing from the washer orifice 29 will strike the upper surface of this plate at its axial center and it is immediately apparent that if the upper surface of this plate 31 were truly flat the flow pattern of the jet would extend in a radial manner from the center of the plate to diverge outwardly in all directions towards the edge of the plate. This is undesirable, for it desired to deflect the circumferentially-distributed radially-directed flow upwardly so that it may diffuse in zeolite particles throughout the upper chamber U of the shell. To deflect this jet, an axially-centered circular mound 35 is formed at the upper surface of the plate 31 with the mound including a small rounded crater 36 at its center. In operation, the jet J from the orifice 29 is adapted to strike into this crater 36, to be necessarily directed upwardly and outwardly therefrom, in a radial manner above the upper surface of the plate 31 and in a manner will permit effective percolation of flow through a body of zeolite as hereinafter described.

Flow from the upper compartment of the cup 11 will necessarily be outwardly from the axis thereof towards the wall 12 of the unit and thence around the peripheral edge of the plate 31 to the lower compartment L. It is contemplated that the lower compartment will be effectively packed with zeolite so that the manner of flow therefrom will be percolation, and the flow must be collected from a comparatively large surface in order to be discharged from the unit without creating excessive back pressure. This is accomplished by forming a collection chamber 37 at the center portion bottom of the unit, the chamber being formed by a short upstanding axially-centered cylindrical wall 38 about half the diameter of the wall 12. The top edge of this wall is formed with an internally rabbeted seat 39 wherein a perforated disc 40 is mounted. This disc 40 includes the series of annular, axially-centered, evenly-spaced, upstanding ledge rims 41 and a circumferential array of orifice 42 in each valley between the ledges 41. A fine-mesh disc-shaped filter screen 43 is adapted to be placed over this disc 40 to rest upon the spaced ledges 41 and provide free communication of water filtering through the screen and into the orifice 42, since water moving into the chamber 37 is discharged from an orifice 44 in the discharge spout 15. It is to be noted that the cross sectional area of this orifice 44 and the aggregate area of the passageways of the orifices 42 is greater than the cross sectional area of the orifice 29 in the washer 27, and this will effectively keep the orifice 29 as the control of flow through the unit.

In preparing this water softener for use, the unit is filled with a fine-grain zeolite 45, as illustrated at FIG. 5 and once filled, the lid 16 is permanently secured to the cup 11, as with a suitable waterproof glue or plastic solvent. The zeolite may be snugly packed in the lower chamber L, however, it is preferable to pack the zeolite loosely in the upper chamber U so that a small cavity will form at the center of the chamber whenever water flows from the orifice 29 as the jet J strikes into the crater 36. The deflection of this jet in an outward and upward manner, strikes the body of the zeolite to establish this cavity and spreads the flow to initiate effective percolation of flow through the zeolite in the upper chamber U, the flow being in a radial direction toward the outer wall 12 of the cup. Thence, the flow will turn downwardly to be directed about the periphery of the plate 31. Thence, the flow will percolate through the zeolite in the lower chamber toward the axial center of the unit, to pass through the screen 43, the orifices 42 and into the collection chamber for ultimate discharge from the discharge orifice 44. To obtain effective operation of the unit it is essential that the flow of the water through the zeolite be regulated and directed in such a manner as to produce a sufficient contact time between the water and the surfaces of the zeolite particles. It is also obvious that the orifice 29 must be the control to produce the jet J. Therefore, in operation of the unit, this flow and the size of the jet J can be related to the water pressure available at the faucet, and the diameter of this orifice 29 can easily be designed for any water pressure available such as 15 pounds, 30 pounds, or 50 pounds per square inch. However, it was found that a small orifice, about ⅛-inch in diameter would be generally adequate to effectively control the flow through the softener when it is hooked up to most conventional water systems.

The unit as thus described is capable of softening approximately fifty gallons of water, although, this amount will vary considerably, depending upon the locality and the extent of hardness in the water. When it has performed to its capacity and further softening action is not possible, the water-softener unit may be recharged by flowing a brine solution into the unit and leaving it sit for several hours. This recharging operation is essentially conventional, and hence, may be performed in various ways which need not be described herein.

It is recognized that this water softener unit is an excellent unit for shampooing operations, and when it is desired to use the unit thus, an extension spray having a rubber hose of any common type may be provided and the hose of the spray may be affixed to the discharge spout 15.

I have now described my intention in considerable detail; however, it is obvious that others skilled in the art can build and devise alternate and equivalent construction which are within the spirit and scope of my invention since I desire that my protection be limited, not by the constructions illustrated and described, but only by proper scope of the appended claims.

I claim:
1. A portable water softener comprising:
   (a) a comparatively short, enclosed, cylindrical, axially-symmetrical body structure having an axially-centered intake passageway at one end thereof and an axially-centered discharge passageway at the other end thereof;
   (b) means at the intake passageway adapted to connect with a conduit having pressurized water supply;
   (c) a short extension of the intake passageway into the body and a washer cap having an axially-centered, restrictive orifice traversing the terminus of said passageway, adapted to restrict the flow of water into the body as an axially-directed jet through the orifice;
   (d) a circular plate mounted within the body and means on the body to hold the plate, transversely of the axis thereof, at the approximate central portion thereof to divide the body interior into a first compartment at the intake side and a second compartment at the discharge side, said plate being axially centered within the body and having a diameter smaller than the diameter of the body to provide a ring-like communication space between the first and second compartments outwardly of the peripheral edge of the plate;
   (e) a charge of water softener particles within the body, with the particles in the first compartment being loosely packed and with the particles in the second compartment being tightly packed, said loosely-packed particles of the first said compartment being adapted to permit a jet flowing through the orifice to spread the particles aside from the axis of the compartment; and said ring-like communication space being comparatively narrow and of such size as to prevent substantial intermixing of the particles in the two compartments;
   (f) an axially-centered crater at the face of the plate in the first compartment adapted to spread the flow of the jet striking the plate in a radially-dispersed manner; and
   (g) a collection chamber having a particle-blocking screen means over it within the said second compartment over the discharge passageway, adapted to permit water to flow from the particles, through the screen means, into the collection chamber and thence, through the passageway.

2. In the organization defined in claim 1, wherein said collection chamber comprises a short circular wall upstanding from the lower end of the second chamber about the discharge passageway and a reticulated covering means about the top edge of the wall whereby to permit flow through the zeolite particles in the lower compartment to enter the chamber through the recticulated member.

3. In the organization set forth in claim 1, wherein said intake passageway extends into the first said compartment as a cylindrical stub adapted to position said washer carrying the discharge orifice at a short distance from the crater at the center of the plate sufficient to permit the jet to strike the crater with substantial force.

References Cited by the Examiner

UNITED STATES PATENTS

| 223,741 | 1/80 | Lansburgh | 210—285 |
| 277,203 | 5/83 | Benson | 210—285 |
| 582,496 | 5/97 | Avery | 210—449 X |
| 1,261,558 | 4/18 | Lackland | 210—451 X |
| 2,073,991 | 3/37 | Koser | 210—456 X |
| 2,367,557 | 1/45 | Atwood | 210—456 X |
| 2,761,832 | 9/56 | Robb et al. | 210—451 X |
| 3,121,685 | 2/64 | Hazel | 210—451 X |
| 3,122,501 | 2/64 | Hultgren | 210—451 X |

REUBEN FRIEDMAN, *Primary Examiner.*

HERBERT L. MARTIN, *Examiner.*